US008014343B2

United States Patent
Wang et al.

(10) Patent No.: US 8,014,343 B2
(45) Date of Patent: Sep. 6, 2011

(54) METHOD FOR ENHANCED DEDICATED CHANNEL (E-DCH) TRANSMISSION OVERLAP DETECTION FOR COMPRESSED MODE GAP SLOTS

(75) Inventors: Peter S. Wang, E. Setauket, NY (US); Guodong Zhang, Farmingdale, NY (US); Stephen E. Terry, Northport, NY (US); Kyle Jung-Lin Pan, Smithtown, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 737 days.

(21) Appl. No.: 11/858,337

(22) Filed: Sep. 20, 2007

(65) Prior Publication Data

US 2008/0069280 A1 Mar. 20, 2008

Related U.S. Application Data

(60) Provisional application No. 60/826,277, filed on Sep. 20, 2006.

(51) Int. Cl.
H04W 4/00 (2009.01)
(52) U.S. Cl. ........................................ 370/328; 375/363
(58) Field of Classification Search .................. 370/328, 370/229, 313; 455/522
See application file for complete search history.

(56) References Cited

U.S. PATENT DOCUMENTS

| 2007/0047437 A1* | 3/2007 | Bachl et al. | 370/229 |
| 2007/0076644 A1* | 4/2007 | Bachl et al. | 370/313 |
| 2008/0102880 A1* | 5/2008 | Gholmieh et al. | 455/522 |

FOREIGN PATENT DOCUMENTS

| EP | 1143634 | 10/2001 |
| WO | 01/52585 | 7/2001 |
| WO | 2004/091231 | 10/2004 |

OTHER PUBLICATIONS

3GPP, "3$^{rd}$ Generation Partnership Project; Technical Specification Group Radio Access Network; FDD Enhanced Uplink; Overall Description; Stage 2 (Release 6)", 3GPP TS 25.309 V6.4.0 (Sep. 2005).

3GPP, "3$^{rd}$ Generation Partnership Project; Technical Specification Group Radio Access Network; Multiplexing and Channel Coding (FDD) (Release 6)", 3GPP TS 25.212 V6.6.0 (Sep. 2005).

3GPP, "3$^{rd}$ Generation Partnership Project; Technical Specification Group Radio Access Network; Medium Access Control (MAC) Protocol Specification (Release 6)", 3GPP TS 25.321 V6.5.0 (Jun. 2005).

(Continued)

*Primary Examiner* — Albert T Chou
(74) *Attorney, Agent, or Firm* — Volpe and Koenig, P.C.

(57) ABSTRACT

A method and apparatus for detecting an overlap of an E-DCH transmission or retransmission in TTIs that overlap with an assigned uplink compressed mode gap is disclosed. More specifically, detecting an overlap of an E-DCH transmission or retransmission in TTIs that overlap with an uplink compressed mode gap assigned by a Node B when a WTRU is configured with a 2 ms TTI is disclosed. After detecting the overlap of the E-DCH transmission or retransmission and the uplink compressed mode gap, the E-DCH transmission or retransmission is paused.

22 Claims, 5 Drawing Sheets

OTHER PUBLICATIONS

3GPP, "3rd Generation Partnership Project; Technical Specification Group Radio Access Network; Multiplexing and Channel Coding (FDD) (Release 7)", 3GPP TS 25.212 V7.5.0 (May 2007).

3GPP, "3rd Generation Partnership Project; Technical Specification Group Radio Access Network; Multiplexing and Channel Coding (FDD) (Release 7)", 3GPP TS 25.212 V7.1.0 (Jun. 2006).

3GPP, "3rd Generation Partnership Project; Technical Specification Group Radio Access Network; Multiplexing and Channel Coding (FDD) (Release 6)", 3GPP TS 25.212 V6.10.0 (Dec. 2006).

3GPP, "3rd Generation Partnership Project; Technical Specification Group Radio Access Network; Multiplexing and Channel Coding (FDD) (Release 6)", 3GPP TS 25.212 V6.8.0 (Jun. 2006).

3GPP, "3rd Generation Partnership Project; Technical Specification Group Radio Access Network; Physical Channels And Mapping of Transport Channels Onto Physical Channels (FDD) (Release 7)", 3GPP TS 25.211 V7.2.0 (May 2007).

3GPP, "3rd Generation Partnership Project; Technical Specification Group Radio Access Network; Physical Channels and Mapping of Transport Channels Onto Physical Channels (FDD) (Release 7)", 3GPP TS 25.211 V7.0.0 (Mar. 2006).

3GPP, "3rd Generation Partnership Project; Technical Specification Group Radio Access Network; FDD Enhanced Uplink; Overall Description; Stage 2 (Release 6)", 3GPP TS 25.309 V6.4.0 (Sep. 2005).

3GPP, "3rd Generation Partnership Project; Technical Specification Group Radio Access Network; Multiplexing and Channel Coding (FDD) (Release 6)", 3GPP TS 25.212 V6.6.0 (Sep. 2005).

3GPP, "3rd Generation Partnership Project; Technical Specification Group Radio Access Network; Medium Access Control (MAC) Protocol Specification (Release 6)", 3GPP TS 25.321 V6.5.0 (Jun. 2005).

3GPP, "3rd Generation Partnership Project; Technical Specification Group Radio Access Network; Multiplexing and Channel Coding (FDD) (Release 7)", 3GPP TS 25.212 V7.5.0 (May 2007).

3GPP, "3rd Generation Partnership Project; Technical Specification Group Radio Access Network; Multiplexing and Channel Coding (FDD) (Release 7)", 3GPP TS 25.212 V7.1.0 (Jun. 2006).

3GPP, "3rd Generation Partnership Project; Technical Specification Group Radio Access Network; Multiplexing and Channel Coding (FDD) (Release 6)", 3GPP TS 25.212 V6.10.0 (Dec. 2006).

3GPP, "3rd Generation Partnership Project; Technical Specification Group Radio Access Network; Multiplexing and Channel Coding (FDD) (Release 6)", 3GPP TS 25.212 V6.8.0 (Jun. 2006).

3GPP, "3rd Generation Partnership Project; Technical Specification Group Radio Access Network; Physical Channels and Mapping of Transport Channels Onto Physical Channels (FDD) (Release 7)", 3GPP TS 25.211 V7.2.0 (May 2007).

3GPP, "3rd Generation Partnership Project; Technical Specification Group Radio Access Network; Physical Channels and Mapping of Transport Channels Onto Physical Channels (FDD) (Release 7)", 3GPP TS 25.211 V7.0.0 (Mar. 2006).

* cited by examiner

METHOD FOR ENHANCED DEDICATED CHANNEL (E-DCH) TRANSMISSION OVERLAP DETECTION FOR COMPRESSED MODE GAP SLOTS

CROSS REFERENCE TO RELATED APPLICATIONS

This application claims priority from U.S. Provisional Patent Application No. 60/826,277 filed Sep. 20, 2006, which is incorporated by reference as if fully set forth.

FIELD OF INVENTION

The present invention is directed toward wireless communication systems. More particularly, the present invention is related to frequency division duplex (FDD) compressed mode operation in a Third Generation Partnership Project (3GPP) Release 6 wireless transmit/receive unit (WTRU) using an enhanced dedicated channel (E-DCH) and implementing 3GPP Release 6 hardware and software.

BACKGROUND

The enhanced dedicated channel (E-DCH) is a new feature employed in the 3GPP Release 6 FDD systems. The E-DCH is an uplink transport channel. The technical purpose of the E-DCH is to improve the performance of dedicated transport channels by increasing channel capacity, increasing channel throughput, and reducing delays with the deployment of smaller CDMA spreading factors and multiple channelization codes. Further, the E-DCH permits transmission scheduling and power management for WTRUs in communication with a Node B. For example, the E-DCH facilities high speed uplink transmission capability up to 5.76 Mbps and provides a significant improvement in performance. The E-DCH also maintains the regular mobility functions of a WTRU, such as performing measurements over neighboring cells for a handover operation or preparation for cell reselection.

According to the E-DCH feature, the Node B first assigns an uplink compressed mode gap pattern to a WTRU. Then, the WTRU performs E-DCH uplink transmissions over the E-DCH. When a WTRU is configured with a 2 ms transmission time interval (TTI), the WTRU does not perform E-DCH uplink transmissions and retransmissions in TTIs that overlap with an uplink compressed mode gap. When a WTRU is configured with a 10 ms TTI, the WTRU adjusts a serving grant and scales back the power of E-DCH uplink transmissions and retransmissions in TTIs that overlap with an uplink compressed mode gap.

The Node B may assign the uplink compressed mode gaps at different positions in a radio frame. For example, the Node B may position the uplink compressed mode gaps for the purpose of inter-frequency or inter-RAT power measurement, the acquisition of a control channel of a different system or carrier, or an actual handover operation.

FIG. 1a and FIG. 1b are diagrams of a compressed mode gap position in a radio frame. A radio frame may be either a universal mobile telecommunications system (UMTS) or a wideband code division multiple access (WCDMA) radio frame.

As shown in FIG. 1a and FIG. 1b, the network may position compressed mode gaps in a radio frame using one of two methods. FIG. 1a shows a compressed mode gap 110 positioned within a radio frame 120 using a single-frame method. In the single-frame method, a compressed mode gap is positioned within a radio frame depending on a transmission gap length (TGL). FIG. 1b shows a compressed mode gap 130 positioned at the end of a first radio frame 140 and the beginning of a second radio frame 150 using a double-frame method.

The Node B assigns the uplink compressed mode gaps using a TGL. The TGL is the number of consecutive idle time slots during a compressed mode gap. The idle time slots in a compressed mode gap are consecutive whether the compressed mode gap is positioned using a single-frame method or a double-frame method. Each time slot within a radio frame is numbered (N) and ranges from 0 to 14. The number of the first idle time slot of the consecutive idle time slots is $N_{first}$. The number of the last idle time slot of the consecutive idle time slots is $N_{last}$. If $N_{first}+TGL \leq 15$, then $N_{last}=N_{first}+TGL-1$ in the same radio frame. If $N_{first}+TGL>15$, then $N_{last}=\{(N_{first}+TGL-1) \bmod 15\}$ in the next radio frame. When the compressed mode gap spans two consecutive radio frames, the $N_{first}$ and the TGL must be chosen such that at least 8 time slots in each radio frame are transmitted.

FIG. 2a and FIG. 2b are diagrams of a compressed mode gap position having different starting time slots in a radio frame. As shown in FIG. 2a and FIG. 2b, the Node B may position compressed mode gaps in a radio frame using one of two methods. In FIG. 2a, using a single-frame method, the Node B may position a compressed mode gap within the radio frame 220 in different positions 210, 212, 214 using a different $N_{first}$. In FIG. 2b, using a double-frame method, the Node B may position a compressed mode gap at the end of a first radio frame 240 and the beginning of a second radio frame 250 in different positions 230, 232, 234 using a different $N_{first}$.

As stated above, a WTRU configured with a 2 ms TTI does not perform E-DCH uplink transmissions or retransmissions in TTIs that overlap with an assigned uplink compressed mode gap. All E-DCH uplink transmissions or retransmissions in TTIs that overlap with the assigned uplink compressed mode gap are paused. Further, there is no need to perform any new transmission related functions, such as evolved transport format combination (E-TFC) selection, multiplexing processing, etc. Additionally, there are no hybrid automatic repeat request (H-ARQ) transmissions or retransmissions in a TTI that overlaps with an uplink compressed mode gap. If an H-ARQ process is scheduled to retransmit during an overlapping TTI, then the H-ARQ process is also paused.

Therefore, there exists the need to meet the 3GPP compressed mode operation requirements and E-DCH uplink specific transmission characteristics when a WTRU is configured with a 2 ms TTI. As a result, it would be desirable to permit detection of an overlap of E-DCH uplink transmissions or retransmissions in TTIs that overlap with an assigned uplink compressed mode gap.

SUMMARY

A method and apparatus for detecting an overlap of an E-DCH transmission or retransmission in TTIs that overlap with an assigned uplink compressed mode gap is disclosed. More specifically, detecting an overlap of an E-DCH transmission or retransmission in TTIs that overlap with an uplink compressed mode gap assigned by a Node B when a WTRU is configured with a 2 ms TTI is disclosed. After detecting the overlap of the E-DCH transmission or retransmission and the uplink compressed mode gap, the E-DCH transmission or retransmission is paused.

BRIEF DESCRIPTION OF THE DRAWINGS

The foregoing summary, as well as the following detailed description of the preferred embodiments will be better understood with references to appended drawings, wherein.

DETAILED DESCRIPTION OF THE PREFERRED EMBODIMENTS

Hereafter, a wireless transmit/receive unit (WTRU) includes but is not limited to a user equipment (UE), mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

The features described herein may be incorporated into an integrated circuit (IC) or be configured in a circuit comprising a multitude of interconnecting components.

Figure 1A:
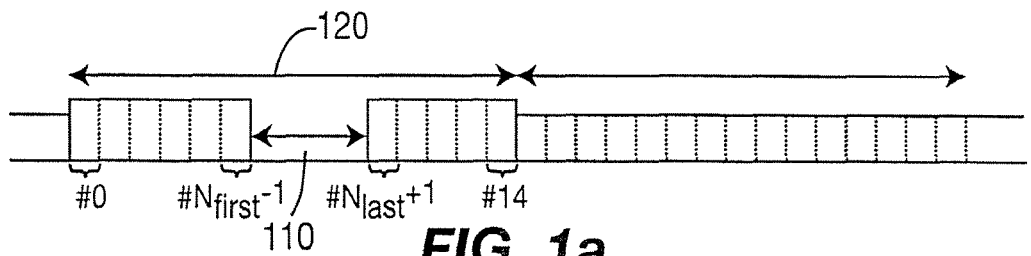
FIG. 1a and FIG. 1b are diagrams of a compressed mode gap position in a radio frame.
Figure 1B:
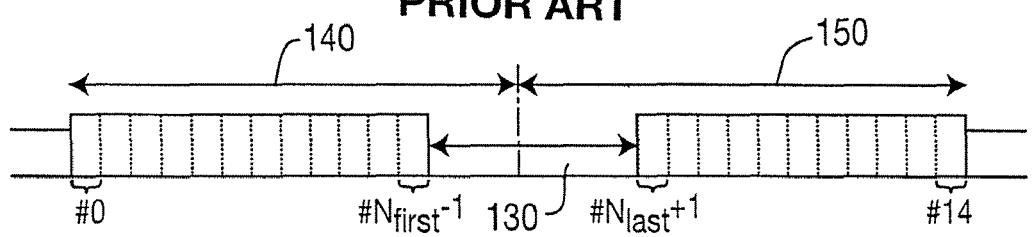
Figure 3:
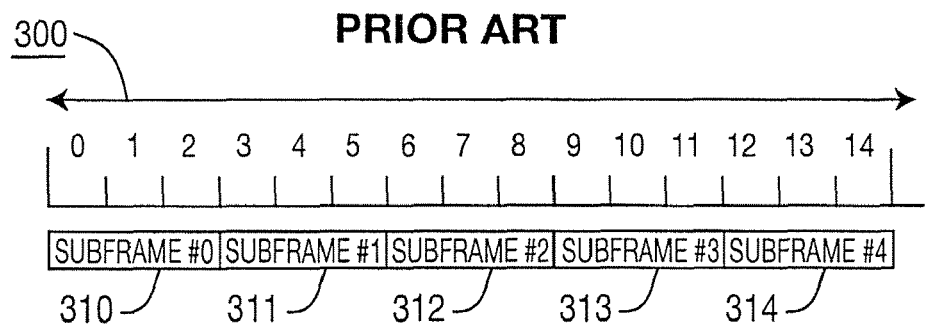
FIG. 3 is a diagram of a radio frame configured for E-DCH operation.

FIG. 3 is a diagram of a radio frame 300 configured for E-DCH operation. The radio frame 300 contains a plurality of time slots and a plurality of E-DCH subframes. Each of the E-DCH subframes within the radio frame 300 has a TTI of 2 ms.

As shown in the FIG. 3, each radio frame 300 comprises fifteen time slots numbered 0 to 14. The fifteen time slots are grouped into five E-DCH subframes 310, 311, 312, 313, 314. The five E-DCH subframes may be identified as subframe #0 to subframe #4. The first E-DCH subframe 310, subframe #0, starts at the beginning of the radio frame 300 at time slot 0. The last E-DCH subframe 314, subframe #4, ends with radio frame 300 at time slot 14. Each of the E-DCH subframes is synchronized with the time slots in the radio frame 300 and is recycled with each radio frame 300.

Each of the E-DCH subframes consists of three time slots. Each of the three time slots in the E-DCH subframe may be denoted by the following:

$$N_{e\text{-}ts\text{-}first} = 3 * E\text{-}DCH \text{ subframe } \#$$ (Equation 1)

$$N_{e\text{-}ts\text{-}middle} = 3 * E\text{-}DCH \text{ subframe } \# + 1$$ (Equation 2)

$$N_{e\text{-}ts\text{-}last} = 3 * E\text{-}DCH \text{ subframe } \# + 2$$ (Equation 3)

where the E-DCH subframe # ranges from 0 to 4 to indicate the five E-DCH subframes within each radio frame 300. For example, the third E-DCH subframe, E-DCH subframe #2, in a radio frame starts at time slot 6, has a middle time slot 7, and ends at time slot 8. Therefore, each E-DCH subframe has a starting time slot, $N_{e\text{-}ts\text{-}first}$, and an ending time slot, $N_{e\text{-}ts\text{-}last}$, that may be used to detect the overlap of an E-DCH transmission with an uplink compressed mode transmission gap.

Figure 4:
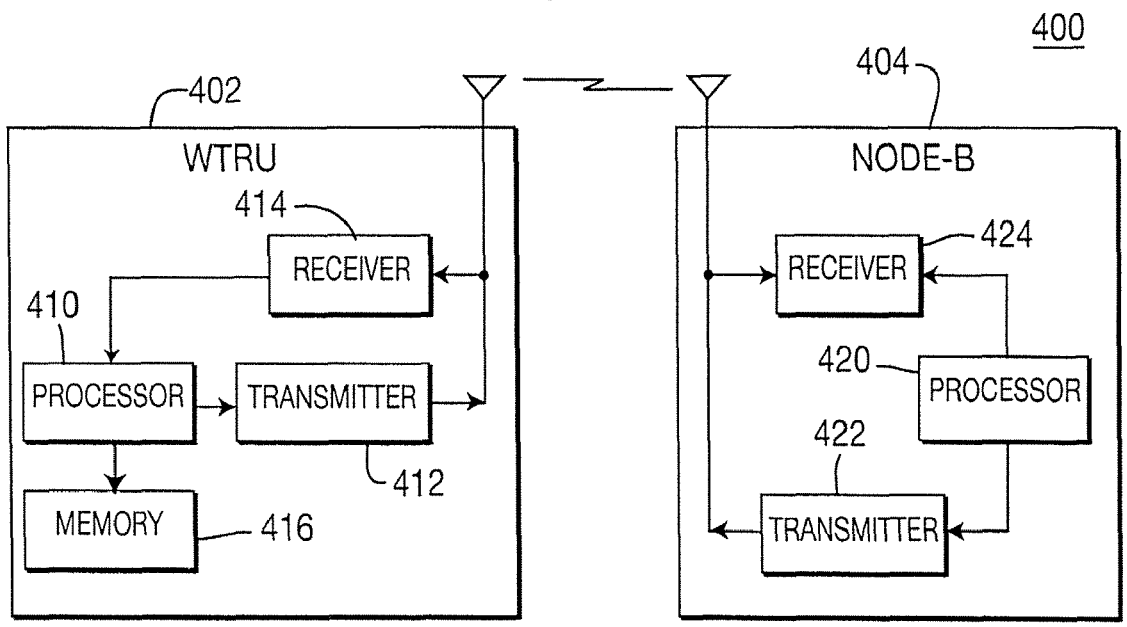
FIG. 4 is a block diagram of a wireless communication system configured in accordance with the present invention.
Figure 2A:
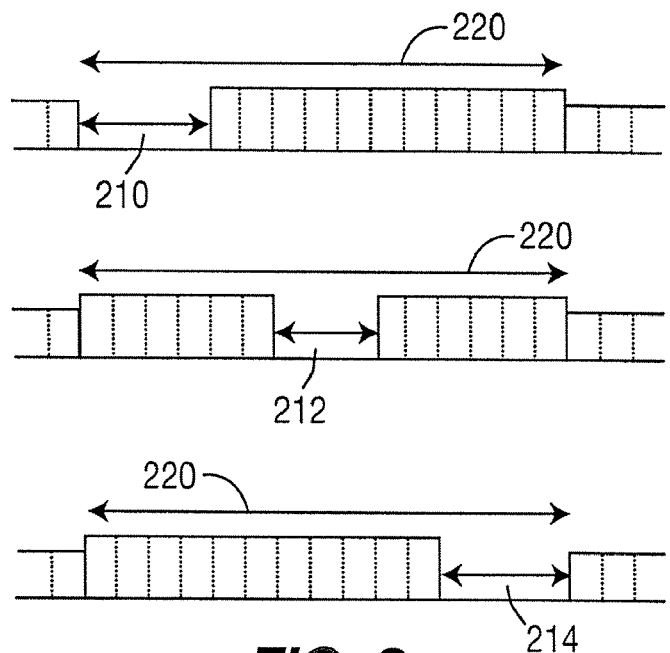
FIG. 2a and FIG. 2b are diagrams of a compressed mode gap position having different starting time slots in a radio frame.
Figure 2B:
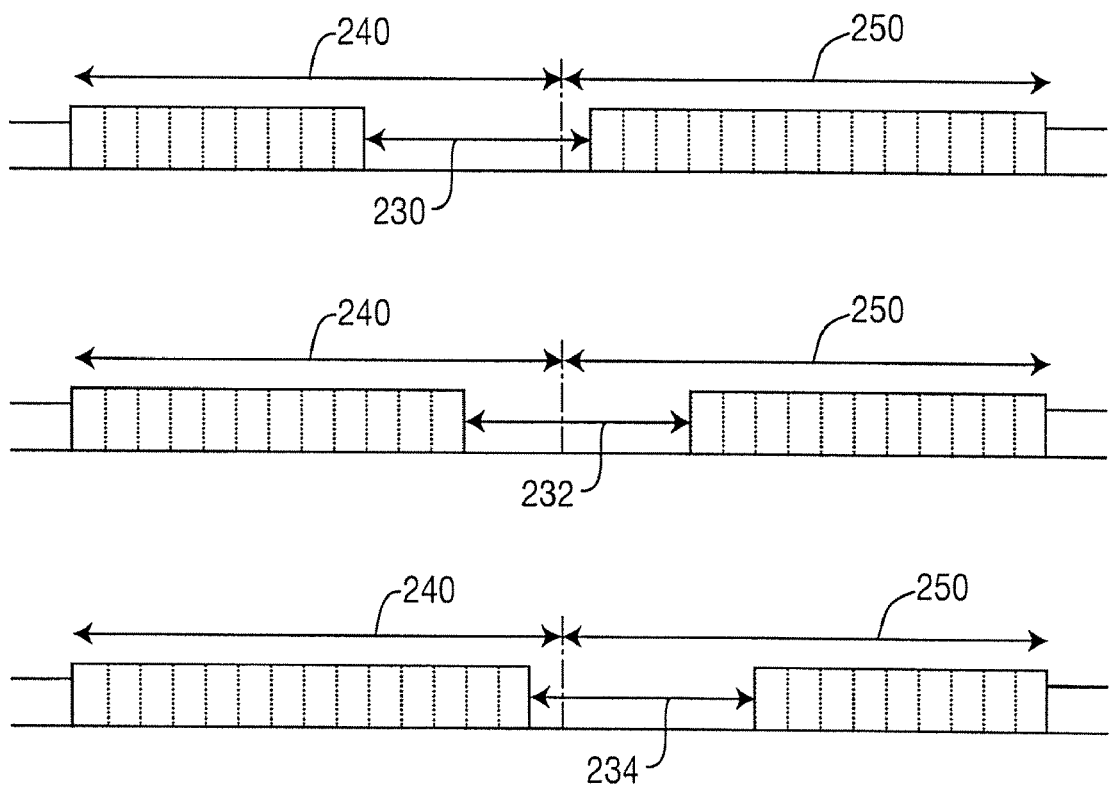

FIG. 4 is a block diagram of a wireless communication system 400 including a wireless transmit/receive unit (WTRU) 402 and a Node B 404. The WTRU 402 and the Node B communicate using radio resource control (RRC) signaling. As stated above, the WTRU and the Node B implement 3GPP Release 6 hardware and software and support the E-DCH feature.

As shown in FIG. 4, the WTRU 402 includes a processor 410, a transmitter 412, a receiver 414, and a memory 416.

The processor 410 is configured to process a received uplink compressed mode gap pattern, generate an uplink compressed frame gap description map, and detect the overlap of E-DCH transmissions and a compressed mode transmission gap. The processor 410 is further configured to store the generated uplink compressed frame gap description map in the memory 416. The uplink compressed frame gap description map is further described below.

The transmitter 412 is configured to transmit enhanced dedicated channel (E-DCH) transmissions from the WTRU 402 to the Node B 404. The receiver 414 is configured to receive the uplink compressed mode gap pattern when the uplink compressed mode is activated by the Node B. The uplink compressed mode gap pattern includes at least one uplink compressed mode transmission gap.

The memory 416 is configured to store the uplink compressed frame gap description map generated by the processor 410. The stored uplink compressed frame gap description map is used by the WTRU to facilitate further compressed mode operation.

In an alternative embodiment, the processor 410 is further configured to generate an E-DCH subframe overlap description map and check the overlap of E-DCH subframes in an E-DCH transmission and compressed mode transmission gaps.

The processor is further configured to store the uplink compressed frame gap and subframe overlap description map in the memory 416. The uplink compressed frame gap and subframe overlap description map is further described below.

Still referring to FIG. 4, the Node B 404 includes a processor 420, a transmitter 422, and a receiver 424. The processor 420 is configured to activate the uplink compressed mode.

The transmitter 422 is configured to transmit an uplink compressed mode transmission gap pattern to the WTRU 402 using radio resource control (RRC) signaling. The uplink compressed mode gap pattern comprises a compressed mode transmit gap slot pattern, a frame number of the radio frame in which the uplink compressed mode begins, and the length of the uplink compressed mode transmission gap pattern. Each transmission gap consists of a number of consecutive time slots whether the transmission gap is a single-frame gap or a double-frame gap. The time slots within a transmission gap may be referred to as a gap slot.

The uplink compressed mode transmit gap slot pattern is signaled using a transmission gap starting slot number (TGSN), a transmission gap length (TGL), and a transmission gap pattern length (TGPL). The TGSN is the slot number of the first transmission gap slot within the first radio frame of the transmission gap pattern. The TGL is the duration of the transmission gap within the transmission gap pattern represented in a number of time slots. The TGPL is the duration of a transmission gap pattern represented in a number of frames.

The frame numbers of the radio frame in which the uplink compressed mode transmission gap begins and the length of the compressed mode transmit gap pattern are signaled using a transmission gap connection frame number (TGCFN) and a transmission gap pattern repetition count (TGPRC). The TGCFN is the CFN of the first radio frame of the first pattern within the transmission gap pattern sequence. The TGPRC is the number of transmission gap patterns within the transmission gap pattern sequence.

Figure 5:
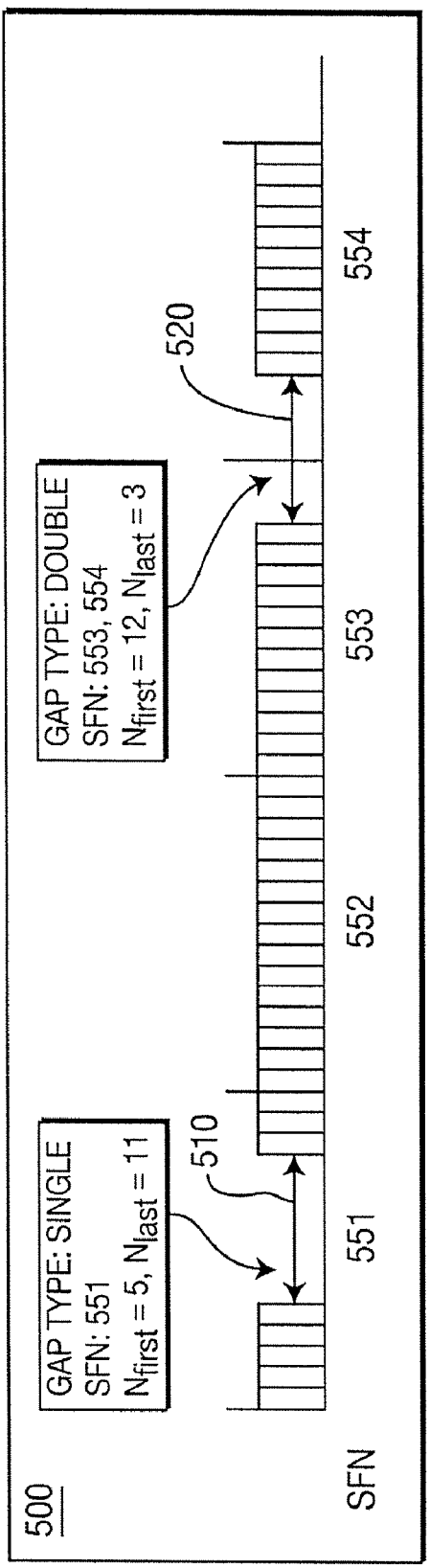
FIG. 5 is a diagram of an uplink compressed frame gap description map.

FIG. 5 is a diagram of an uplink compressed frame gap description map. The uplink compressed frame gap description map 500 identifies uplink compressed mode transmission gaps in a compressed radio frame.

In a preferred embodiment, each uplink compressed mode transmission gap is identified by a label comprising a gap pattern type, at least one system frame number (SFN), a time slot number within the SFN indicating the start of the compressed frame transmission gap, and a time slot number within the SFN indicating the end of the compressed frame transmission gap. As stated above, the gap pattern type may be either a single-frame gap or a double-frame gap. A single frame gap only requires one SFN while a double-frame gap requires a beginning SFN and an ending SFN. The time slot number that starts the gap is represented by $N_{first}$ and the time slot number that ends the gap is represented by $N_{last}$. The values of $N_{first}$ and $N_{last}$ range from 0 to 14.

For example, the compressed frame gap 510 is labeled a single-frame gap with a SFN of 551 and a $N_{first}$ of 5 and $N_{last}$ of 11. The compressed frame gap 520 is labeled a double-frame gap with a beginning SFN of 553 and an ending SFN of 554 and a $N_{first}$ of 12 and $N_{last}$ of 3.

The generation of the uplink compressed frame gap description map 500 requires pre-computation for runtime efficiency. However, if the compressed mode is run for a prolonged period of time, then the processing required for computing the uplink compressed frame gap description map 500 may take an unreasonable amount of time and require a large amount of memory for storage.

In a preferred embodiment, the uplink compressed frame gap description map 500 is periodically updated and stored using a ring-buffer memory scheme for the maintenance of the compressed frame gap description map 500. A ring-buffer is a data structure that uses a single, fixed-size buffer as if it was connected end-to-end and operates in a circular fashion.

Figure 6:
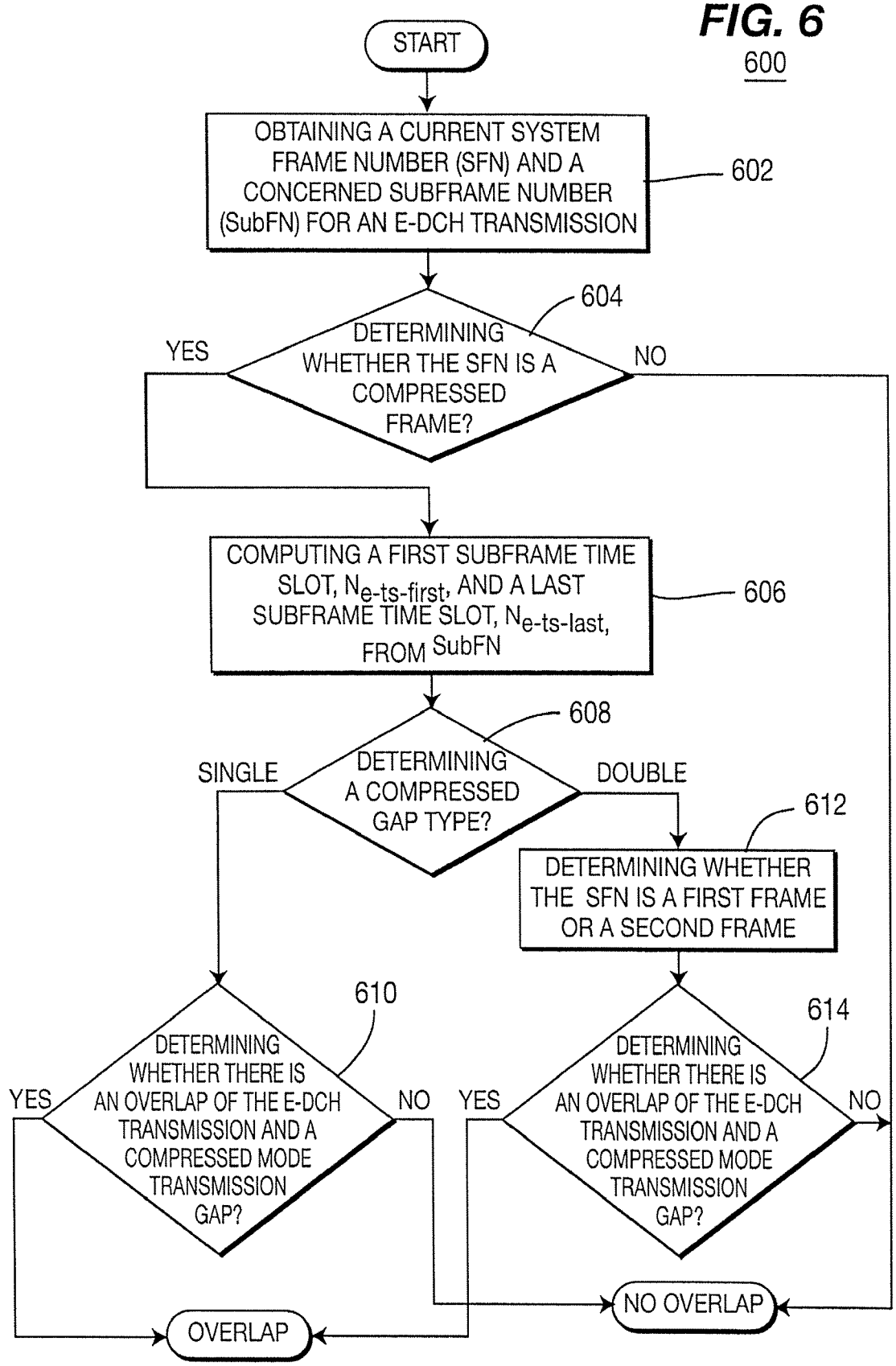
FIG. 6 is a flow diagram of a method for detecting the overlap of 2 ms E-DCH transmissions and compressed mode gap slots.

FIG. 6 is a flow diagram of a method 600 for detecting the overlap of E-DCH transmissions and an uplink compressed mode transmission gap in a WTRU configured with a 2 ms TTI. In a preferred embodiment, the method 600 is implemented in a WTRU at the physical layer. Implementing the method 500 in the physical layer enables H-ARQ processes to detect an overlap of a 2 ms TTI retransmission and the uplink compressed mode transmission gap.

In step 602, the WTRU obtains a current running system frame number (SFN) and a concerned subframe number (SubFN) for an E-DCH transmission. The concerned SubFN is the number of a subframe inside a radio frame indexed by the SFN.

In step 604, the WTRU determines whether the SFN for the E-DCH transmission is a compressed frame. In a preferred embodiment, the WTRU is able to make this determination using the uplink compressed frame gap description map described above in FIG. 5. If the concerned SubFN is in a compressed frame, then the WTRU proceeds to step 606. If the concerned SubFN is not in a compressed frame, then there is no overlap of the E-DCH transmission and the uplink compressed mode transmission gap.

In step 606, the WTRU computes a first subframe time slot, $N_{e-ts-first}$, and a last subframe time slot, $N_{e-ts-last}$, from the concerned SubFN for the E-DCH transmission.

In step 608, the WTRU determines a compressed gap type of the SFN for the E-DCH transmission. In a preferred embodiment, the WTRU is able to obtain the compressed gap type from the uplink compressed frame gap description map 500. A compressed gap type may be either a single-frame gap or a double-frame gap. If the compressed gap type is a single-frame gap, then the WTRU proceeds to step 610. If the compressed gap type is a double frame gap, then the WTRU proceeds to step 612.

In step 610, the WTRU determines whether there is an overlap of E-DCH transmissions for a single frame gap. In a single frame gap, there is no transmission overlap when a first transmit time slot, $N_{e-st-first}$, in the concerned SubFN is greater than a last idle time slot, $N_{last}$, in the uplink compressed frame transmission gap or when a last transmit time slot, $N_{e-st-last}$, in the concerned SubFN is less than a first idle time slot, $N_{first}$, in the transmission gap. As shown above, the WTRU is able to detect an overlap for a single frame gap after at most two comparisons.

In step 612, the WTRU determines whether the current SFN is a first frame or a second frame in the double-frame gap. In a preferred embodiment, the WTRU makes this determination by comparing the current SFN against the SFN in the uplink compressed frame gap description map 500.

In step 614, the WTRU determines whether there is an overlap of E-DCH transmissions for a double frame gap. In a double frame gap, if the current SFN is first frame in the double frame gap, then there is no transmission overlap when a last transmit time slot, $N_{e-ts-last}$, in the concerned SubFN is less than a first idle time slot, $N_{first}$, in the uplink compressed mode transmission gap. In a double frame gap, if the current SFN is second frame in the double frame gap, then there is no transmission overlap when a first transmit time slot, $N_{e-ts-first}$, in the concerned SubFN is greater than a last idle time slot, $N_{last}$, in the uplink compressed mode transmission gap.

As shown above, the WTRU is able to detect an overlap for a double frame gap so long as the first frame and second frame in the double-frame gap are known because the transmission gap occupies the end of the first frame and the beginning of the second frame.

In order to detect the overlap of E-DCH transmissions and an uplink compressed mode transmission gap in a WTRU configured with a 10 ms TTI, the physical layer of the WTRU may indicate the status of the uplink compressed mode frame. The physical layer of the WTRU may use the compressed frame gap description map 500 to notify the media access control (MAC) of the status of the uplink compressed mode frame. As a result, if an E-DCH transmission overlaps with an uplink compressed mode transmission gap, the MAC may adjust a serving grant and scale back the power of the E-DCH uplink transmission.

Figure 7:
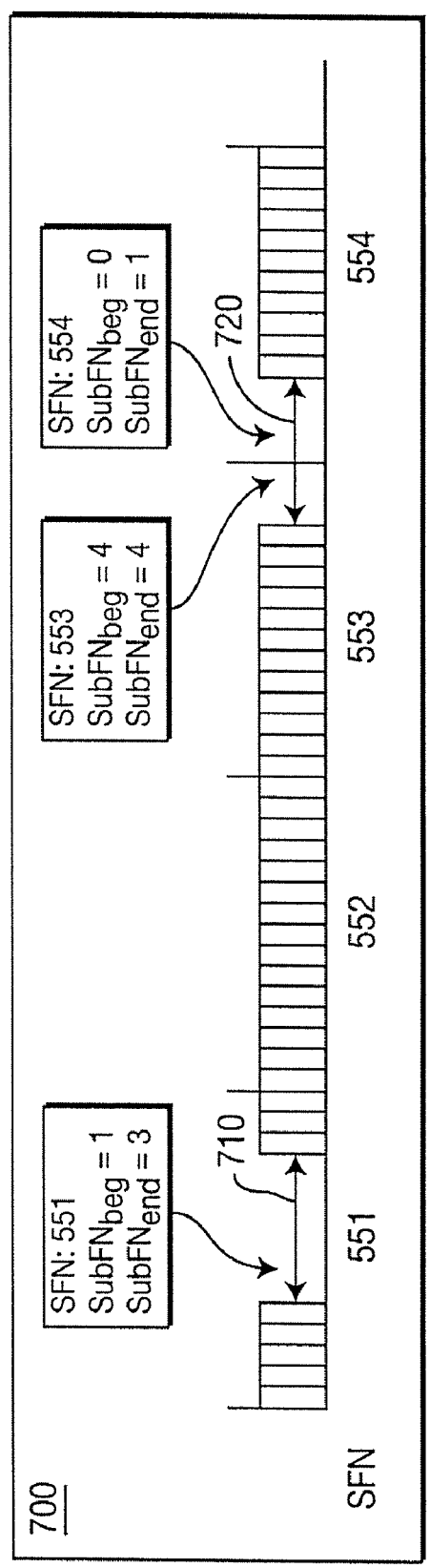
FIG. 7 is a diagram of an E-DCH subframe overlap description map.

FIG. 7 is a diagram of an E-DCH subframe overlap description map 700. The E-DCH subframe overlap description map 700 is generated using the uplink compressed frame gap description map 500 and the overlap detection method 600 described above. The E-DCH subframe overlap description map 700 identifies the subframe numbers for the E-DCH subframes that overlap with uplink compressed mode transmission gaps in compressed radio frames.

In a preferred embodiment, the E-DCH subframes that overlap with uplink compressed mode transmission gaps are identified such that there is a beginning SubFN, $SubFN_{beg}$, and an ending SubFN, $SubFN_{end}$, for each compressed radio frame. As described above, each of the fifteen time slots in a radio frame are grouped into five E-DCH subframes.

In the E-DCH subframe overlap description map 700, the gap slots within a compressed frame gap are consecutive and the maximum number of gap slots in the compressed frame cannot exceed seven. Therefore, there are a maximum of three consecutive E-DCH subframes in a compressed radio frame.

The E-DCH subframe overlap description map 700 is computed using the following:

$$SubFN_{beg}=N_{first}/3 \quad \text{(Equation 4)}$$

$$SubFN_{end}=N_{last}/3 \quad \text{(Equation 5)}$$

where the values of $SubFN_{beg}$ and $SubFN_{end}$ range in value from 0 to 4 to indicate each of the five E-DCH subframes within a radio frame.

For example, the compressed single-frame gap 710, corresponding to compressed single-frame gap 510 in FIG. 5, with a SFN of 551 has a $N_{first}$ of 5 and a $N_{last}$ of 11. Using the equations above, the compressed single-frame gap 710 has a $SubFN_{beg}$ of 1 and a $SubFN_{end}$ of 3.

As an additional example, the compressed double-frame gap 720, corresponding to double-frame gap 520 in FIG. 5, with a SFN of 553 has a $N_{first}$ of 12 and a $N_{last}$ of 14 and a SFN of 554 has a $N_{first}$ of 0 and a $N_{last}$ of 3. Using the equations above, the compressed double-frame gap 720 has a $SubFN_{beg}$ of 4 and a $SubFN_{end}$ of 4 for the SFN of 553 and a $SubFN_{beg}$ of 0 and a $SubFN_{end}$ of 1 for the SFN of 554.

The generation of the uplink compressed frame and subframe overlap description map 700 requires more involved pre-computation than the pre-computation required to produce an uplink compressed frame gap description map 500. However, the runtime efficiency is more greatly enhanced using the uplink compressed frame and subframe overlap description map 700.

Figure 8:
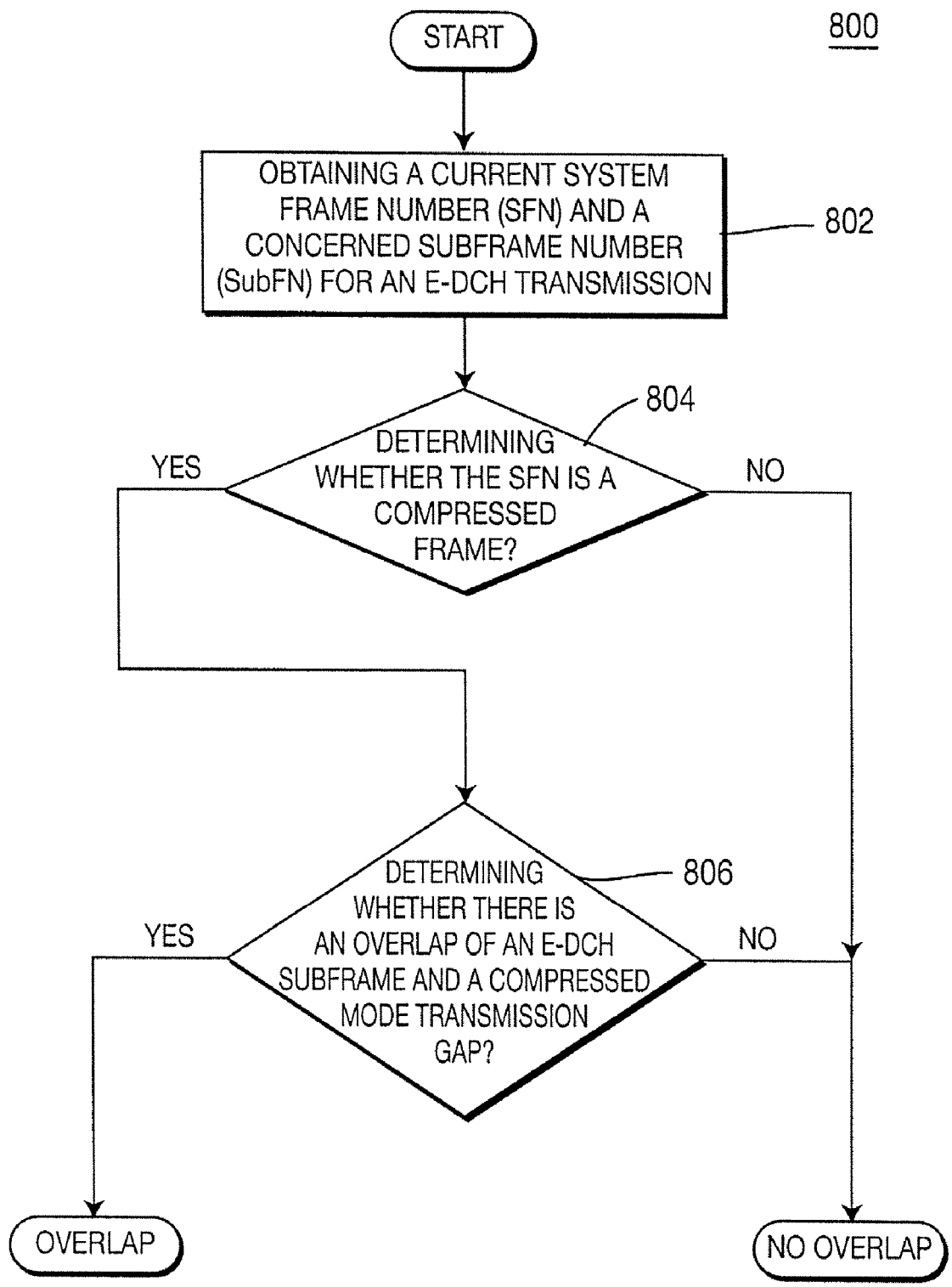
FIG. 8 is a flow diagram of a method for detecting the overlap of an E-DCH subframe and a compressed mode transmission gap.

FIG. 8 is a flow diagram of a method 800 for checking the overlap of E-DCH subframes and uplink compressed mode transmission gaps. For E-DCH subframes in a compressed radio frame, the method 800 determines whether a particular E-DCH subframe overlaps with an uplink compressed mode transmission gap after at most two comparisons. In a preferred embodiment, the method 800 is implemented in a WTRU at the physical layer.

In step 802, the WTRU obtains a current system frame number (FN), in terms of SFN, and a concerned SubFN for an E-DCH transmission.

In step 804, the WTRU determines whether the SFN is a compressed frame. In a preferred embodiment, the WTRU is able to make this determination using the E-DCH subframe overlap description map 700 described above.

When the concerned SubFN is in a compressed frame, then the WTRU proceeds to step 806. When the concerned SubFN is not in a compressed frame, then there is no overlap of the E-DCH subframe and the uplink compressed mode transmission gap.

In step 806, the WTRU determines whether there is an overlap of an E-DCH subframe in a compressed radio frame and an uplink compressed mode transmission gap. In a preferred embodiment, the WTRU is able to make this determination using the E-DCH subframe overlap description map 700 described above.

There is no overlap when the concerned SubFN for the E-DCH transmission is greater than an ending subframe, $SubFN_{end}$, in the compressed radio frame. Further, there is no overlap when the concerned SubFN is less than a beginning subframe, $SubFN_{beg}$, in the compressed radio frame. There is an overlap of the E-DCH subframe and the uplink compressed mode transmission gap in at all other times.

The method 800 for checking the overlap of E-DCH subframes and uplink compressed mode transmission gaps has improved runtime efficiency compared to the method 600 for detecting E-DCH transmission overlaps. However, this improved efficiency requires more pre-computation operations to create the E-DCH subframe overlap description map 700 required for the method 800.

The methods disclosed above may be implemented in any type of wireless communication system, as desired. By way of example, the methods may be implemented in any type of WCDMA, CDMA2000, GERAN, FDD, EUL, FDD R6 UE, EUL, Enhanced Uplink or any other type of wireless communication system. The methods disclosed above may also be implemented in software, or on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s). The method disclosed above may be implemented in the physical layer (Layer 1), the Data Link Layer (Layer 2), or the L1 control layer.

Although features and elements are described in the preferred embodiments in particular combinations, each feature or element can be used alone (without the other features and elements of the preferred embodiments) or in various combinations with or without other features and elements.

What is claimed is:

1. A method for detecting an overlap of an enhanced dedicated channel (E-DCH) transmission from a wireless transmit/receive unit (WTRU) and a Node B assigned uplink compressed mode transmission gap, the method comprising:
   obtaining a current system frame number (SFN) and a concerned subframe number (SubFN) for the E-DCH transmission;
   determining whether the SFN for the E-DCH transmission is a compressed frame using an uplink compressed frame gap description map;
   computing a first subframe time slot, $N_{e\text{-}st\text{-}first}$, and a last subframe time slot, $N_{e\text{-}st\text{-}last}$, using the concerned SubFN for the E-DCH transmission;
   determining a compressed gap type of the SFN for the E-DCH transmission using the uplink compressed frame gap description map;
   determining whether the compressed gap type is a single-frame gap or a double-frame gap;
   determining whether there is an overlap of an E-DCH transmission upon a condition that the compressed gap type is a single frame gap;
   determining whether the SFN is a first frame or a second frame in a double frame gap upon a condition that the SFN for the E-DCH transmission is a double frame gap type; and
   determining whether there is no E-DCH transmission overlap upon a condition that SFN is the first frame in the double frame gap and the last time slot, $N_{e\text{-}ts\text{-}last}$, in the concerned SubFN is less than a first idle time slot, $N_{first}$, in the uplink compressed mode transmission gap.

2. The method of claim 1 further comprising:
   determining whether there is an overlap of the E-DCH transmission and the uplink compressed mode transmission gap when the SFN for the E-DCH transmission is a single frame gap type using the uplink compressed frame gap description map.

3. The method of claim 2 wherein there is no overlap of the E-DC(transmission and the uplink compressed mode transmission gap for a single frame gap type when the first time slot, $N_{e\text{-}st\text{-}first}$, in an E-DCH subframe is greater than the last idle time slot, $N_{last}$, in a radio frame or when the last time slot, $N_{e\text{-}st\text{-}last}$, in an E-DCH subframe is less than the first idle time slot, $N_{first}$, in the radio frame.

4. The method of claim 1 further comprising:
   determining whether there is an overlap of the E-DCH transmission and the uplink compressed mode transmission gap when the SFN for the E-DCH transmission is a double frame gap type using the uplink compressed frame gap description map.

5. The method of claim 1 wherein the uplink compressed frame gap description map is generated using an uplink compressed mode gap pattern.

6. The method of claim 1 wherein the uplink compressed frame gap description map identifies each uplink compressed mode transmission gap with a label comprising a gap pattern type, at least one SFN, a time slot number within the SFN indicating the start of the compressed frame transmission gap, and a time slot number within the SFN indicating the end of the compressed frame transmission gap.

7. The method of claim 1 wherein the WTRU is configured with a 2 ms transmission time interval (TTI).

8. The method of claim 1 wherein the WTRU is configured with a 10 ms transmission time interval (TTI).

9. A method for checking the overlap of enhanced dedicated channel (E-DCH) subframes in an E-DCH transmission from a wireless transmit/receive unit (WTRU) and a Node B assigned uplink compressed mode transmission gap, the method comprising:
   obtaining a current system frame number (SFN) and a concerned subframe number (SubFN) for the E-DCH transmission;
   determining whether the SFN for the E-DCH transmission is a compressed frame using an E-DCH subframe overlap description map; and
   determining whether there is an overlap of the E-DCH subframe and the uplink compressed mode transmission gap using the E-DCH subframe overlap description map.

10. The method of claim 9 wherein there is no overlap of the E-DCH subframe and the uplink compressed mode transmission gap when the SubFN is greater than an ending subframe, $SubFN_{end}$, in the compressed frame.

11. The method of claim 9 wherein there is no overlap of the E-DCH subframe and the uplink compressed mode transmission gap when the SubFN is less than a beginning subframe, $SubFN_{beg}$, in the compressed frame.

12. The method of claim 9 wherein the E-DCH subframe overlap description map is generated after detecting the overlap of E-DCH transmissions and uplink compressed mode transmission gaps using an uplink compressed frame gap description map.

13. The method of claim 9 wherein the E-DCH subframe overlap description map identifies E-DCH subframes that overlap with uplink compressed mode transmission gaps such that there is a beginning SubFN, $SubFN_{beg}$, and an ending SubFN, $SubFN_{end}$, for the compressed radio frame.

14. The method of claim 9 wherein the WTRU is configured with a 2 ms transmission time interval (TTI).

15. The method of claim 9 wherein the WTRU is configured with a 10 ms transmission time interval (TTI).

16. A wireless transmit/receive unit (WTRU), the WTRU comprising:
   a receiver configured to receive an uplink compressed mode gap pattern, wherein the uplink compressed mode gap pattern includes at least one uplink compressed transmission gap;
   a transmitter configured to transmit enhanced dedicated channel (E-DCH) transmissions;
   a processor configured to process the received uplink compressed mode gap pattern, generate an uplink compressed frame gap description map, and detect the overlap of an enhanced dedicated channel transmission and an uplink compressed transmission gap; and
   a memory configured to store the uplink compressed frame gap description map generated by the processor.

17. The WTRU of claim 16 wherein the uplink compressed frame gap description map identifies each uplink compressed mode transmission gap with a label comprising a gap pattern type, at least one SFN, a time slot number within the SFN indicating the start of the compressed frame transmission gap, and a time slot number within the SFN indicating the end of the compressed frame transmission gap.

18. The WTRU of claim 16 wherein the processor is further configured to generate an E-DCH subframe overlap description map and check the overlap of E-DCH subframes in an E-DCH transmission and a compressed mode transmission gap.

19. The WTRU of claim 18 wherein the memory is further configured to store the E-DCH subframe overlap description map generated by the processor.

20. The WTRU of claim 18 wherein the E-DCH subframe overlap description map identifies E-DCH subframes in an E-DCH transmission that overlap with uplink compressed mode transmission gaps such that there is a beginning SubFN, $SubFN_{beg}$, and an ending SubFN, $SubFN_{end}$.

21. The WTRU of claim 16 wherein the WTRU is configured with a 2 ms transmission time interval (TTI).

22. The WTRU of claim 16 wherein the WTRU is configured with a 10 ms transmission time interval (TTI).

* * * * *

UNITED STATES PATENT AND TRADEMARK OFFICE
CERTIFICATE OF CORRECTION

| | |
|---|---|
| PATENT NO. | : 8,014,343 B2 |
| APPLICATION NO. | : 11/858337 |
| DATED | : September 6, 2011 |
| INVENTOR(S) | : Wang et al. |

Page 1 of 1

It is certified that error appears in the above-identified patent and that said Letters Patent is hereby corrected as shown below:

At Claim 3, column 8, line 62, before "and the", delete "E-DC(transmission" and insert
--E-DCH transmission--.

Signed and Sealed this
Fourteenth Day of February, 2012

David J. Kappos
*Director of the United States Patent and Trademark Office*